(No Model.) 3 Sheets—Sheet 1.

O. M. MORSE.
SEPARATING MACHINE.

No. 587,990. Patented Aug. 10, 1897.

Witnesses:
Ernest Pulsford.
Chas. F. Burkhardt.

O. M. Morse,
Inventor.
By Wilhelm & Bonner
Attorneys.

(No Model.) 3 Sheets—Sheet 2.

O. M. MORSE.
SEPARATING MACHINE.

No. 587,990. Patented Aug. 10, 1897.

Witnesses:
Ernest Pulsford.
Chas. F. Burkhardt.

O. M. Morse, Inventor.
By Wilhelm & Bonner, Attorneys.

(No Model.) 3 Sheets—Sheet 3.
O. M. MORSE.
SEPARATING MACHINE.
No. 587,990. Patented Aug. 10, 1897.
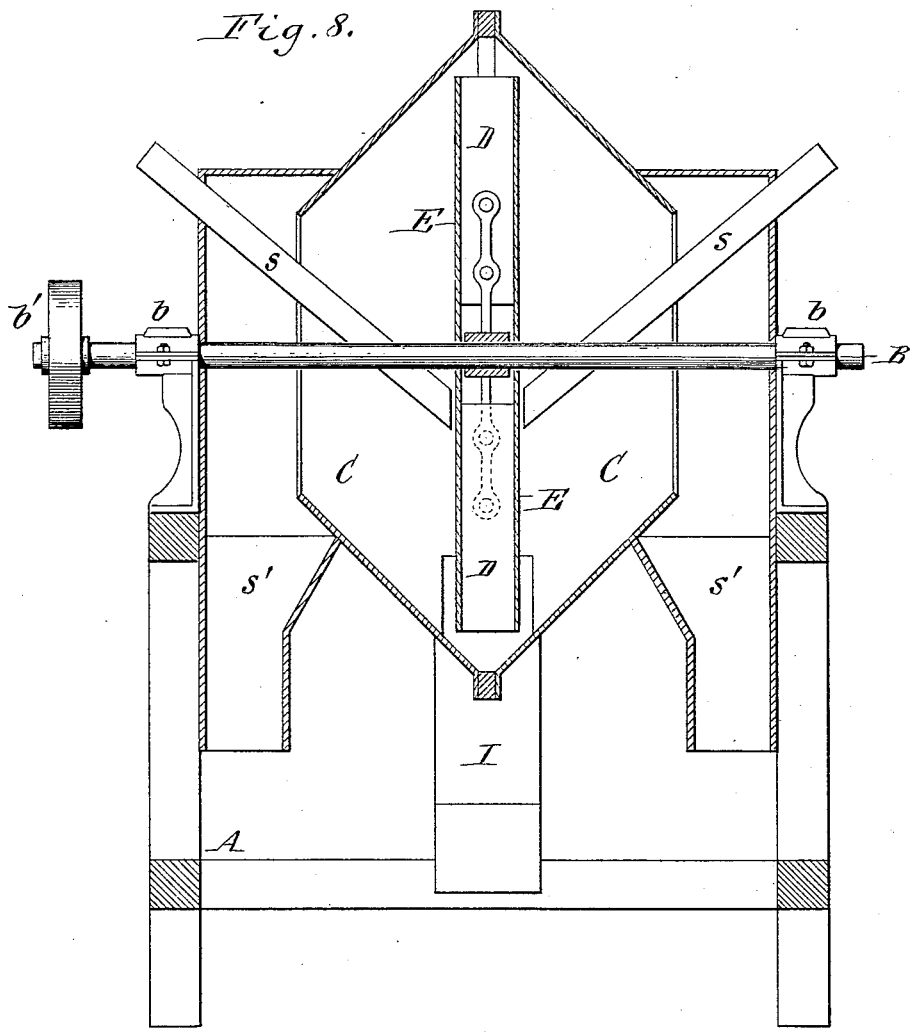
Witnesses:
Ernest Pulsford.
Chas. F. Burkhardt.
O. M. Morse, Inventor
By Wilhelm & Bonner,
Attorneys

UNITED STATES PATENT OFFICE.

ORVILLE M. MORSE, OF JACKSON, MICHIGAN.

SEPARATING-MACHINE.

SPECIFICATION forming part of Letters Patent No. 587,990, dated August 10, 1897.

Application filed March 22, 1897. Serial No. 628,587. (No model.)

*To all whom it may concern:*

Be it known that I, ORVILLE M. MORSE, a citizen of the United States, residing at Jackson, in the county of Jackson and State of Michigan, have invented new and useful Improvements in Separating-Machines, of which the following is a specification.

This invention relates to a separating-machine for separating mixtures of coarse and fine pulverulent, granular, and similar materials or substances into different grades according to their fineness or weight.

The object of this invention is to produce a simple and compact machine, whereby very light, fine, or impalpable substances or ingredients can be satisfactorily separated from coarser substances or ingredients.

My improved separating-machine is particularly suitable for separating flour and fluff from middlings, which operation is usually called "dusting" the middlings, for separating smut and light dust from the scourings of wheat, and for separating the gritty particles from the fine impalpable powder of ground graphite, but may also be used for many other purposes, especially where the fine material is so light or fluffy that it cannot be separated by means of cloths or screens.

Figure 1:
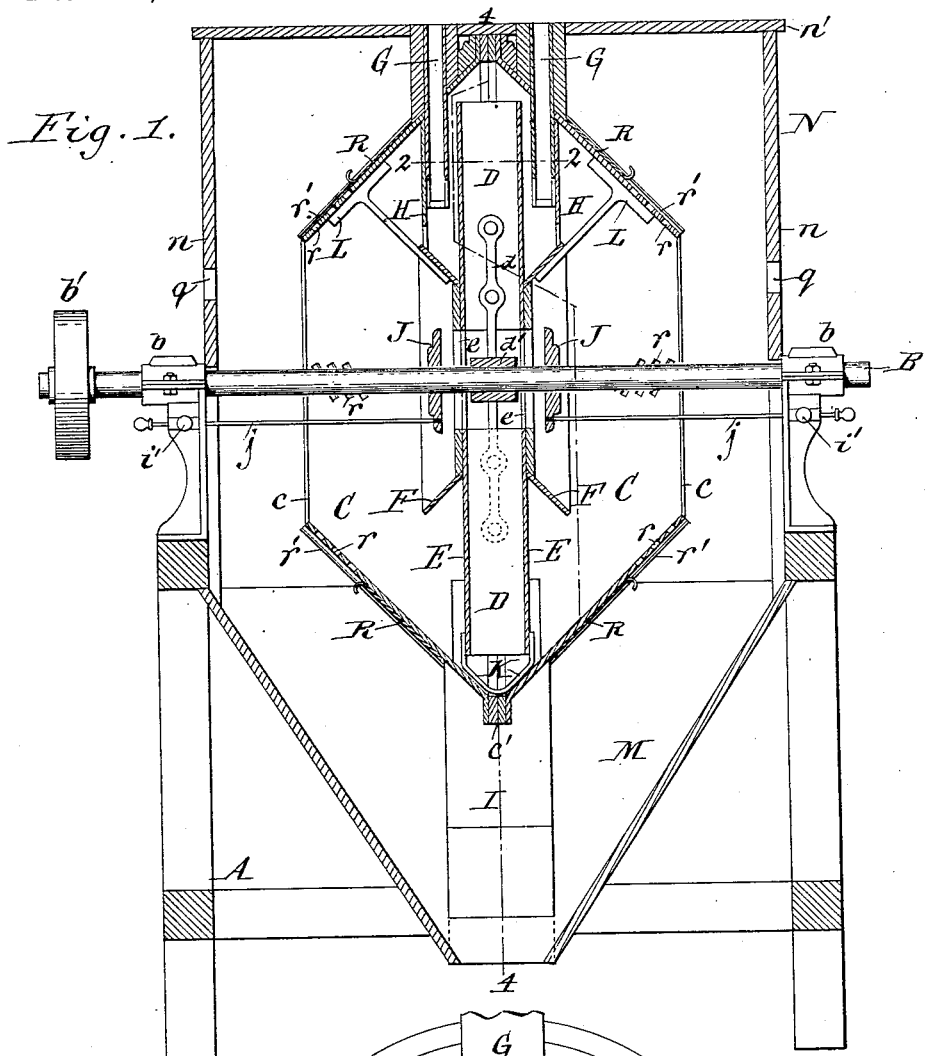
Figures 2, 3:
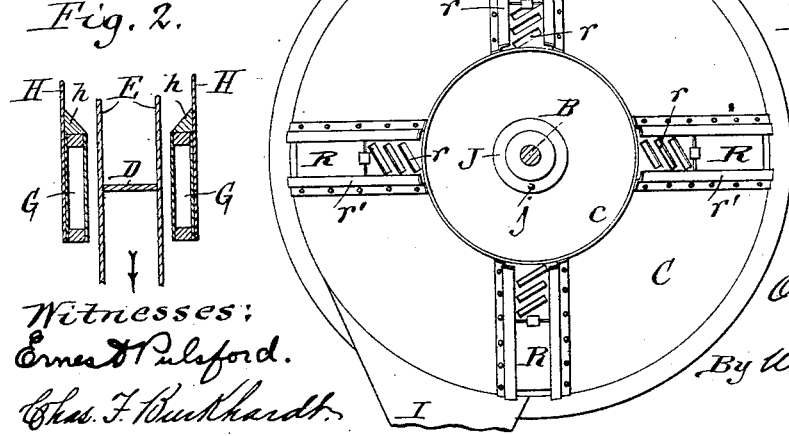
Figure 4:
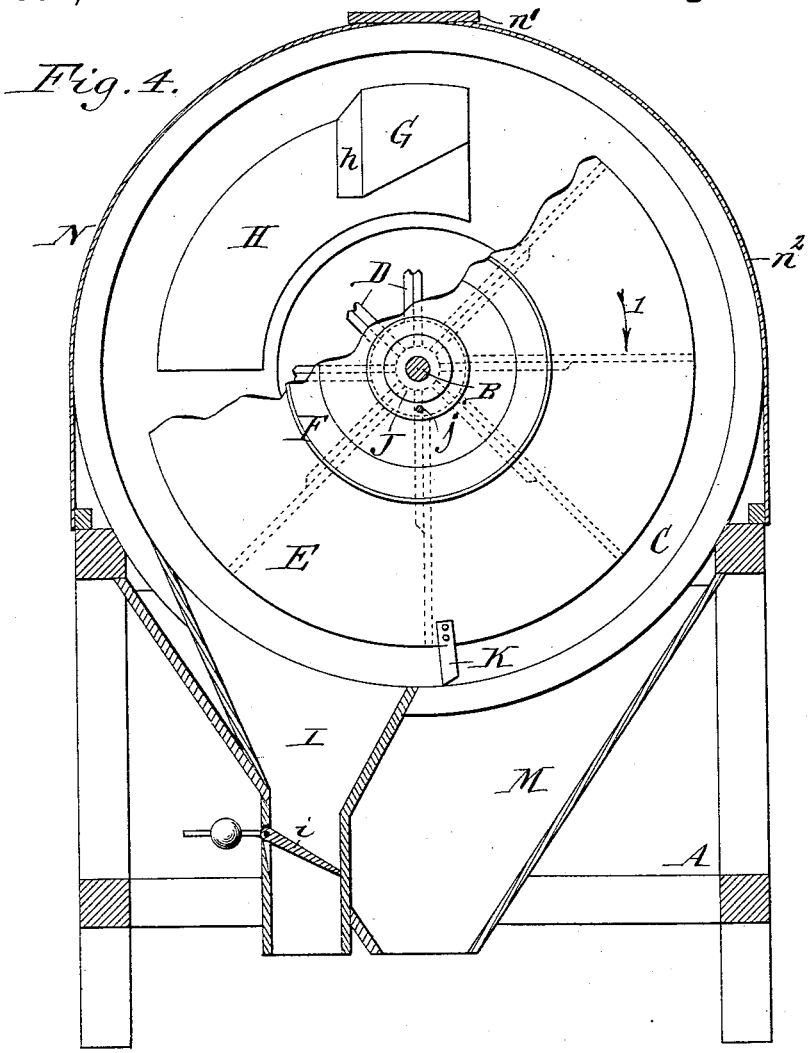
Figure 5:
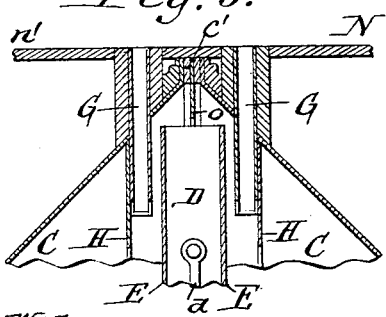
Figure 6:
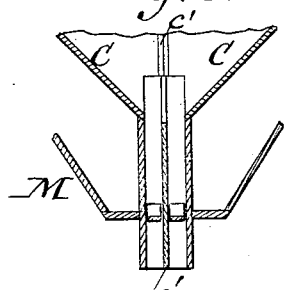
Figure 7:
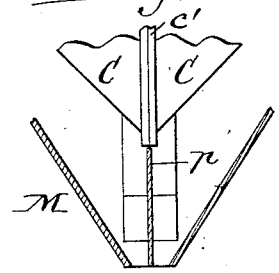

In the accompanying drawings, consisting of three sheets, Figure 1 is a longitudinal sectional elevation of my improved separating-machine. Fig. 2 is a horizontal section through the feed-spouts in line 2 2, Fig. 1. Fig. 3 is an end elevation of the conical separating-chamber on a reduced scale. Fig. 4 is a vertical cross-section in line 4 4, Fig. 1, showing the fan-wheel partly in section and partly broken away. Fig. 5 is a vertical section of the upper part of the separating-chamber, showing the latter divided by an annular partition. Fig. 6 is a vertical section, on a reduced scale, of the lower part of the separating-chamber, showing the discharge-spout for the heavy material similarly divided. Fig. 7 is a similar view showing the receiving-hopper for the light material similarly divided. Fig. 8 is a longitudinal sectional elevation showing a modified construction of my separating-machine.

Like letters of reference refer to like parts in the several figures.

The machine which is represented in the accompanying drawings is a horizontal duplex machine composed of two like sets of operative parts arranged on opposite sides of the vertical center line of the machine.

A represents the stationary frame of the machine, and B the horizontal driving-shaft, which is journaled in bearings $b$ $b$, secured to the frame A and receiving its motion by a pulley $b'$.

C C represent the two parts of the duplex separating case or chamber, each having the form of a truncated cone which is open at its small end, as shown at $c$. The large ends of these cones are secured together by an interposed connecting-ring $c'$.

D represents fan-blades, which are secured to the shaft B by arms $d$ and a hub $d'$ within the large inner portion of the duplex separating-chamber. E represents annular plates or disks which are secured to the side edges of the fan-blades and which close both sides of the fan, except at the center, where each plate is provided with an opening or eye $e$.

F represents an annular flaring or conical flange which is secured with its small end to the outer side of each fan-disk E outside of and concentric with the central eye thereof. G is a flat feed-spout which is secured in the upper portion of each separating-case C, near the outer side of the fan-disk, so as to deliver the material into the space formed between the fan-disk and the inner side of the conical flange F. The latter forms an annular feed-chamber which receives the material from the feed-spout and delivers the material against the outer side of the fan-disk.

H represents a segmental shield which is secured to the outer side of the lower portion of the feed-spout, which projects into the separating-chamber. This shield depends below the spout and extends from the spout about a quarter-turn around the conical flange F in a direction opposite to that in which the fan rotates and has its inner edge arranged near the outer edge of this flange. The lower end of the spout is oblique in the direction of its broad side, with the deepest portion arranged on that side toward which the fan rotates, so that the rotatory air-current first strikes the deepest portion of the spout and is thereby prevented from blowing into the open end of the spout in passing by the same, but rather exhausts the air from the spout, whereby the delivery of the material from the spout is facilitated. The angle between the shield and the deep front side of the spout is preferably filled with an angular corner-piece $h$ to avoid an abrupt face on the feed-spout.

I represents the discharge-spout for the heavy material. This spout is connected with the large central portion of the duplex separating-chamber in the lower portion thereof and preferably on that side of the conical walls on which the rotatory air-current ascends. This spout is closed by a weighted valve $i$, of well-known construction, which opens automatically from time to time under the weight of accumulated material.

J represents a valve-disk which is arranged on the shaft outside of each eye of the fan-wheel and by which the eye can be closed. Each valve-disk is mounted on the shaft so as to be capable of sliding thereon and is provided with an adjusting-rod $j$, which extends outwardly through an opening in the bearing $b$ of the shaft, in which it is clamped by a set-screw $i'$.

K represents a V-shaped sweep which is attached to the periphery of the fan-wheel for sweeping the angle at the junction of the two conical parts of the separating-chamber, and L represents sweeps which are attached to the flanges F for sweeping the inner sides of the conical walls outside of the feed-spouts.

M represents a hopper which is secured to the main frame and arranged underneath the separating-chamber for receiving the fine material which issues from the open small ends thereof. This hopper forms the lower part of an inclosing casing, the upper part N being formed by wooden end pieces $n$, a longitudinal wooden top piece $n'$, and a curved covering $n^2$, which may be of canvas or other porous material.

The material to be separated is fed from the feed-spouts into the annular feed-chambers formed by the conical flanges F. The latter rotate rapidly with the fan-wheel in the direction of the arrow 1, Fig. 4, and direct the material against the flat side plates or disks of the fan-wheel, by which the material is driven outwardly against the conical walls of the separating-chamber and toward the large end thereof. The rotation of the fan-wheel produces in each of the conical parts of the separating-chamber a rotatory air-current which circulates in each part from the large end to the small end thereof along the peripheral wall of the chamber and back through the axial portion of the chamber. This current is the stronger the wider the eye of the fan is opened and is not entirely extinguished by closing the eye, because then the flat side of the fan-wheel and the conical flange drive the air outwardly in the large portion of the separating-chamber. The rotatory and circulatory movement which is maintained in each part of the separating-chamber effects a separation of the fine material from the coarser and drives the fine material to the small end of the chamber, from which it is discharged into the hopper, while the coarser material is driven to the large end of the chamber and is discharged through the spout which leads therefrom. Coarse particles which are swept upwardly past the inlet-opening of the discharge-spout and are deflected toward the small end of the separating-case by any cause are intercepted by the segmental shield which is arranged between the inlet-opening of the discharge-spout and the feed-spout on the side on which the whirling current runs upwardly. This shield confines such particles to the large portion of the case until they have moved past the feed-spout and have reached the side on which the current descends, where no tendency exists to deflect large particles toward the small end of the chamber. In this manner the finest impalpable pulverulent material can be effectively separated from coarse material—for instance, the fine flour and fluffy material from the middlings of reground middlings.

By adjusting the valve-disks toward and from the eyes of the fan the operation of the machine can be regulated as the material may require.

The machine can be readily organized for operating upon two different kinds of material at the same time by arranging between the large ends of the conical separating-cases an annular partition $o$, as represented in Fig. 5, and dividing the discharge-spout by a partition $o'$ into two separate spouts, as represented in Fig. 6, and dividing the receiving-hopper by a partition $p$ into two separate parts, as represented in Fig. 7.

The bevel of the conical separating-chamber is preferably such that the material will run on the same to the large end by gravity, preferably about forty-five degrees, as the centrifugal action and the circulating action are comparatively small and are best supplemented by gravity action so far as the heavy or coarse grade of material is concerned. The fan-blades themselves do not come in contact with the material which is being separated, whereby the reduction or wearing of the material by the fan-blades is prevented.

The outer case is preferably provided with a few small openings $q$, through which air can enter in sufficient quantity to replace any air which may escape through the porous covering of the outer case.

The point at which the fine material is discharged from each end of the separating-chamber can be regulated by means of discharge-openings $r$, several of which are arranged at different distances from the small ends of the chamber outwardly and adapted to be closed to a greater or less extent by a cover R, arranged on the outer side of the conical case and moving in ways r', secured thereto. There may be several sets of these series of openings in each conical case, four sets being shown in the drawings. When the covers are adjusted so as to close all of these openings, the fine material escapes from the small end of each conical case. By adjusting the covers so as to open these openings the fine material is discharged as soon as it reaches the exposed openings. The point of discharge of the fine material can be regulated by this means as the material may require. The openings are preferably arranged obliquely, as shown, to prevent the rotating sweeps from catching in the same.

In the modified construction represented in Fig. 8 the eyes of the fan-wheel and the annular feed-receiving chambers on the sides of the fan-wheel are omitted and the material is delivered into the separating-chamber by feed-spouts s, which direct the material against the disks of the fan-wheel. This construction of the fan-wheel produces less air-pressure in the larger portion of the separating-chamber and a less lively circulation of air within each tapering portion of the separating-chamber than the first-described construction, in which the fan-wheel is provided with eyes, but nevertheless answers well for separating some kinds of mineral substances. The fine material passes from the small ends of the separating-chamber into separate receptacles s'.

I claim as my invention—

1. In a separating-machine, the combination with a horizontally-arranged tapering separating-chamber having an outlet for the fine material at the small end and an outlet for the heavy material at the large end, of a fan-wheel arranged in the large portion of the separating-chamber and provided with an eye which communicates with the central portion of the chamber and with a blast-discharge extending around said wheel, and a valve whereby said eye can be opened or closed, substantially as set forth.

2. In a separating-machine, the combination with a horizontally-arranged separating-chamber having an outlet for the fine material at the small end and an outlet for the heavy material at the large end, of a central shaft, a fan-wheel mounted on said shaft in the large portion of the separating-chamber and provided with an eye which communicates with the central portion of the chamber, a valve-disk mounted to slide on said shaft, and means whereby said disk can be adjusted toward and from the fan-wheel, substantially as set forth.

3. The combination with the tapering separating-chamber, of a fan-wheel arranged in the large portion of said chamber, an annular feed-receiving chamber arranged on the side of the fan-wheel, and a feed-spout whereby the material is delivered to said receiving-chamber, substantially as set forth.

4. The combination with the tapering separating-chamber, of a fan-wheel arranged in the large portion of the separating-chamber and having an eye which communicates with the central portion of the separating-chamber, an annular feed-receiving chamber arranged on the side of the fan-wheel around said eye, a feed-spout whereby the material is delivered to said receiving-chamber, and a valve-disk made adjustable toward and from said eye, substantially as set forth.

5. The combination with the tapering separating-chamber, of a fan-wheel arranged in the large portion of said chamber, an annular feed-receiving chamber arranged on the side of the fan-wheel, and a depending feed-spout having an oblique lower end, substantially as set forth.

6. The combination with the tapering separating-chamber, of a fan-wheel arranged in the large portion of said chamber, an annular feed-receiving chamber arranged on the side of the fan-wheel, a depending feed-spout delivering the material into said receiving-chamber, a discharge-spout connected with the large end of the separating-chamber, and a shield arranged between the discharge-spout and the feed-spout, substantially as set forth.

7. The combination with a separating-chamber which tapers from its middle toward both ends and which is provided with discharge-openings for the fine material at both ends, of a fan-wheel arranged in the large middle portion of said chamber, means whereby the material is fed into said chamber, a discharge-spout for the heavy material connected with the large middle portion of said chamber, and a receptacle which receives the fine material from the small ends of said chamber, substantially as set forth.

8. The combination with a separating-chamber tapering from the middle toward both ends and provided with discharge-openings for the fine material at both ends, of a fan-wheel arranged in the large middle portion of said chamber and provided with annular feed-receiving chambers on its sides, feed-spouts whereby the material is delivered into said chambers, a discharge-spout for the heavy material connected with the large middle portion of said chamber, and a case inclosing the small ends of said separating-chamber and receiving the light material therefrom, substantially as set forth.

9. The combination with the tapering separating-chamber provided with an outlet for the heavy material at its large end and a series of discharge-openings for the light material arranged at different distances from its small end, of a cover whereby said openings can be opened or closed, and a fan-wheel arranged in the large portion of the separating-chamber, substantially as set forth.

10. The combination with the separating-chamber tapering from its middle toward both ends and provided with an outlet for the heavy material at its large middle portion and with outlets for the light material at its ends, of a fan-wheel arranged in the large middle portion of said chamber and provided at its periphery with a V-shaped sweep, substantially as set forth.

Witness my hand this 16th day of March, 1897.

ORVILLE M. MORSE.

Witnesses:
　　EDWARD WILHELM,
　　KATHRYN ELMORE.